(No Model.)
J. MOORED.
NUT LOCK.
No. 272,971. Patented Feb. 27, 1883.
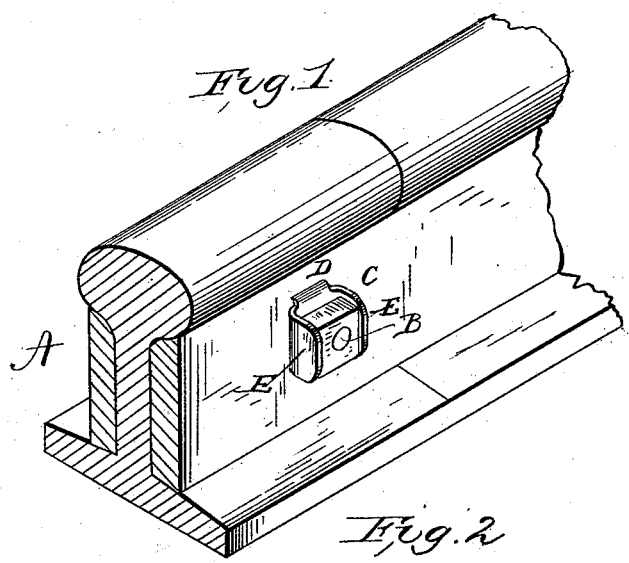
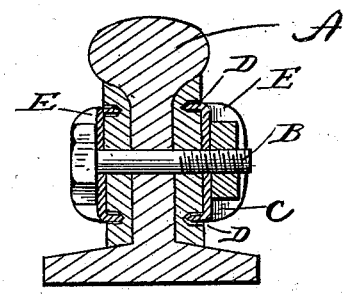
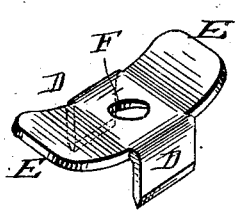
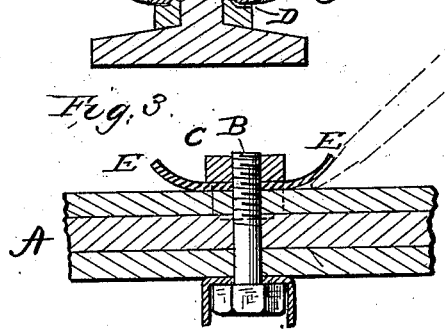
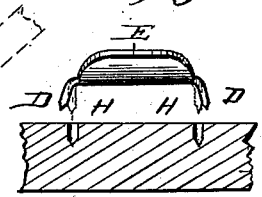
WITNESSES
H. L. Ourand
J. R. Littell
Joel Moored,
INVENTOR
by
C. A. Snow & Co.
Attorneys

UNITED STATES PATENT OFFICE.

JOEL MOORED, OF GREENWOOD, ASSIGNOR OF ONE-HALF TO WALTER A. CHALPANT, OF CAMBRIDGE, OHIO.

NUT-LOCK.

SPECIFICATION forming part of Letters Patent No. 272,971, dated February 27, 1883.

Application filed December 30, 1882. (No model.)

*To all whom it may concern:*

Be it known that I, JOEL MOORED, a citizen of the United States, residing at Greenwood, in the county of Guernsey and State of Ohio, have invented a new and useful Nut-Lock, of which the following is a specification, reference being had to the accompanying drawings.

This invention relates to nut and bolt locks, and has for its object to provide simple, inexpensive, and efficient locking mechanism that can be conveniently operated, and that is adapted for use in connection with the bolts and nuts now generally in use.

The invention consists, substantially, in a peculiarly-formed washer or plate arranged to be applied to the bolt in the usual manner.

In the drawings, Figure 1 is a perspective view showing my improved locking plate or washer in position for securing the nut. Fig. 2 is a longitudinal sectional view of the same. Fig. 3 is another longitudinal sectional view. Fig. 4 is a perspective detail view of the washer detached. Fig. 5 is an end view of the same.

Referring to the drawings, A designates the piece to which the nut and bolt are applied, and B designates the bolt.

C is the locking plate or washer, which is formed with inwardly-extending flanges D, and has its ends E turned outwardly, as shown. This plate C is provided with an opening, F, by which it may be placed on the bolt B.

In applying my improved locking-washer, the bolt is first placed in position, when the said plate C is placed on the bolt, so that its inwardly-extending flanges D will enter the piece A, while its outwardly-turned ends E will rest against the latter, as shown in Fig. 3 of the drawings. The washer-plate is now securely held against rotary movement or lateral displacement by means of its engaging-flanges D, and when its ends E are further turned up, by means of any suitable instrument, they will in like manner firmly secure the nut against displacement.

It is obvious that this improved washer may be applied equally as well to the head G of the bolt when desired to prevent the bolt from turning while the nut is being screwed on.

The inturned flanges D of the locking-plate have their edges H sharpened to facilitate their entrance into the piece A. These edges H are also squared off, as shown, which admits of their taking firmer hold in the piece A, and secures the plate against rotary displacement much more effectively than V-shaped and other forms of edges.

The advantages and adjustment of my improved nut and bolt lock will be readily understood by reference to the above description and the drawings hereto annexed. The device is very simple, and can be manipulated with superior convenience and facility. In operation it is very efficient, and serves to firmly retain either the nut or bolt securely in place without damage to the parts.

Under some circumstances it is proposed to make the flanges D elastic, so that they can be sprung into the recesses formed for their reception in the piece A, and serve to retain the plate C therein while the nut is being screwed.

I claim as my invention—

As an improvement in nut and bolt locks, the combination of the bolt, the nut, the piece against which the locking-plate is to be clamped, having recesses to receive flanges on the locking-plate, and the locking plate or washer having inturned flanges capable of elastic movement, so as to be sprung into the recesses of the piece against which the plate is clamped, the ends of the said plate being curved or turned outwardly, as set forth.

In testimony that I claim the foregoing as my own I have hereto affixed my signature in presence of two witnesses.

JOEL MOORED.

Witnesses:
R. O. BROWN,
JNO. L. LOCKE.